US008128204B2

(12) United States Patent
Ozaki et al.

(10) Patent No.: US 8,128,204 B2
(45) Date of Patent: Mar. 6, 2012

(54) LIQUID EJECTION HEAD AND METHOD FOR MANUFACTURING LIQUID EJECTION HEAD

(75) Inventors: Noriyasu Ozaki, Atsugi (JP); Junichi Kobayashi, Ayase (JP); Shuji Koyama, Kawasaki (JP); Tadanobu Nagami, Yamato (JP); Yoshinori Tagawa, Yokohama (JP); Kenji Fujii, Kawasaki (JP); Hiroyuki Murayama, Kawasaki (JP); Masaki Ohsumi, Yokosuka (JP); Jun Yamamuro, Yokohama (JP); Yoshinobu Urayama, Fujisawa (JP); Hiroyuki Abo, Chigasaki (JP); Takeshi Terada, Tokyo (JP); Masahisa Watanabe, Yokohama (JP); Taichi Yonemoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/009,709

(22) Filed: Jan. 19, 2011

(65) Prior Publication Data

US 2011/0107598 A1 May 12, 2011

Related U.S. Application Data

(62) Division of application No. 12/019,505, filed on Jan. 24, 2008, now Pat. No. 7,891,784.

(30) Foreign Application Priority Data

Jan. 24, 2007 (JP) ................................ 2007-013767

(51) Int. Cl.
*B41J 2/05* (2006.01)
*B41J 2/04* (2006.01)
*G11B 5/127* (2006.01)
*B21D 53/76* (2006.01)

(52) U.S. Cl. ................ 347/56; 347/54; 347/62; 216/27; 29/890.1

(58) Field of Classification Search .................... 347/54, 347/56, 55, 57, 61, 62, 65–67; 216/27, 41, 216/58, 74; 438/21; 29/890.1
See application file for complete search history.

(56) References Cited

U.S. PATENT DOCUMENTS

| | | | | |
|---|---|---|---|---|
| 7,300,596 | B2 * | 11/2007 | Murayama et al. | 216/27 |
| 7,905,576 | B2 * | 3/2011 | Kusunoki | 347/56 |
| 2003/0179266 | A1 * | 9/2003 | Moon et al. | 347/62 |
| 2005/0067376 | A1 * | 3/2005 | Park et al. | 216/27 |
| 2006/0054590 | A1 * | 3/2006 | Krawczyk et al. | 216/27 |

(Continued)

FOREIGN PATENT DOCUMENTS

JP 2001-071504 A 3/2001

(Continued)

*Primary Examiner* — Kristal Feggins
(74) *Attorney, Agent, or Firm* — Canon USA Inc. IP Division

(57) ABSTRACT

A liquid ejection head and a method of forming the same. The liquid ejection head includes a substrate, an ejection port, a liquid channel, and a supply port. The substrate has, above one side thereof, an energy generating element configured to generate energy used to eject liquid. The ejection port, from which a liquid is ejected, is located at a position corresponding to the energy generating element. The liquid channel communicates with the ejection port and penetrates the substrate from the one side to another side of the substrate. The supply port communicates with the liquid channel. The substrate has a projecting layer extending inward of an inner peripheral portion of an opening in the supply port in the one side, and the projecting layer and the energy generating element are formed of the same material.

3 Claims, 13 Drawing Sheets

U.S. PATENT DOCUMENTS

2008/0170101 A1* 7/2008 Kwon et al. .................... 347/45
2009/0065472 A1* 3/2009 Asai et al. ....................... 216/27
2009/0309932 A1* 12/2009 Kim et al. ....................... 347/62
2010/0146787 A1* 6/2010 Ikeda et al. .................. 29/890.1

FOREIGN PATENT DOCUMENTS

JP 2004-090573 A 3/2004
JP 2004-130800 A 4/2004

* cited by examiner

LIQUID EJECTION HEAD AND METHOD FOR MANUFACTURING LIQUID EJECTION HEAD

CROSS REFERENCE OF RELATED APPLICATIONS

This application is a Divisional of U.S. patent application Ser. No. 12/019,505, filed Jan. 24, 2008 which claims the benefit of Japanese Patent Application No. 2007-013767, filed Jan. 24, 2007, which is hereby incorporated by reference herein in its entirety.

BACKGROUND OF THE INVENTION

1. Field of the Invention

The present invention relates to a liquid ejection head that is able to eject a liquid from ejection ports and a method for manufacturing the liquid ejection head.

2. Description of the Related Art

Side shooter liquid ejection heads are known as common liquid ejection heads. The side shooter liquid ejection head has an energy generating element that allows droplets to be ejected perpendicularly to a surface of the head on which the energy generating element is located.

A side shooter liquid ejection head has been proposed which has an electric control circuit built into a substrate to drive the energy generating element. In the liquid ejection head, the electric control circuit is formed inside the substrate using a semiconductor manufacturing technique. A method for manufacturing such a side shooter ink jet head has been disclosed in Japanese Patent Laid-Open No. 09-011479 (1997). According to the method for manufacturing a side shooter ink jet head, disclosed in Japanese Patent Laid-Open No. 09-011479 (1997), the head is manufactured as follows. A substrate formed of silicon is provided, and a silicon anisotropic etching technique is used to form a liquid supply port in the silicon substrate. An ejection port forming layer is then joined to the silicon substrate. A liquid ejection head is thus manufactured.

FIGS. 12, 13A, and 13B show another method for manufacturing a side shooter liquid ejection head. According to the method for manufacturing the side shooter liquid ejection head, at first a liquid supply port formed in the silicon substrate is separated from a liquid channel formed in the ejection port forming layer by a layer formed of a thermal oxide film, an interlayer insulating film, and a protective film. In this state, the layer formed of the thermal oxide film, interlayer insulating film, and protective film is removed, by etching, from an area I shown in FIG. 12 forming the liquid supply port. This allows the liquid supply port to communicate with the liquid channel.

This type of liquid ejection head has been demanded to stabilize frequency properties in order to improve print quality in association with high-speed printing. To stabilize the frequency properties, it is necessary to stabilize a liquid refilling capability with which a liquid is supplied to the liquid channel between the energy generating element and the ejection port after droplets have been ejected from the liquid ejection head. In recent years, in order to improve image quality, the size of droplets has been reduced to increase printing density. Thus, in particular, the refilling capability has been demanded to be stabilized. The liquid refilling capability depends on the opening width of the liquid supply port as well as the distance from the opening end of the liquid supply port to the energy generating element.

However, when the liquid ejection head is manufactured in accordance with the method for manufacturing the ink jet head in Japanese Patent Laid-Open No. 09-011479 (1997), the liquid supply port is formed in the silicon substrate by etching. Consequently, the positional accuracy for the liquid supply port depends on the processing accuracy of the etching. However, for the etching of the silicon substrate, etching rate varies depending on the dissolvability of silicon with respect to an etchant. The dissolvability of the silicon substrate with respect to the etchant varies depending on the position on the silicon substrate. Furthermore, the silicon substrate may contain crystal defects or impurities. Consequently, the etching rate of the silicon substrate varies depending on the position on the silicon substrate. Thus, the positional accuracy of the opening end of the liquid supply port is not fixed; the opening end is not stably formed at the same position. Since the position of the opening end of the liquid supply port is not fixed, a part of the liquid supply port which is in communication with the liquid channel does not have a fixed opening width. Furthermore, the distance from the opening end of the liquid supply port to the energy generating element is not fixed. This prevents droplets ejected from the ejection ports from being stably supplied to print media. Thus, since the liquid supply port is formed in the silicon substrate by etching, a variation occurs in the accuracy of the opening width of the liquid supply port and in the accuracy of the distance from the opening end of the liquid supply port to the energy generating element.

According to the method for manufacturing the liquid ejection head shown in FIGS. 12, 13A, and 13B, the opening in that part of the liquid supply port which is in communication with the liquid channel is also formed by etching. Consequently, with this method, the processing accuracy of the opening width of the liquid supply port also depends on the processing accuracy of the etching of the liquid supply port, as is the case with the method for manufacturing the liquid ejection head in Japanese Patent Laid-Open No. 09-11479. Thus, the positional accuracy of the opening end of the liquid supply port in the manufactured liquid ejection head is not fixed; the opening end is not stably formed at the same position. The distance from the center of the energy generating element to the opening end of the liquid supply port is denoted by E in FIG. 13A and by F in FIG. 13B. As shown in FIGS. 13A and 13B, the distance from the opening end of the liquid supply port, formed by etching, to the energy generating element varies between E and F; the variation amounts to about 10 to 30 μm. This is due to a variation in silicon dissolvability and in the rate of the etching of the silicon substrate, depending on the area to be etched.

SUMMARY OF THE INVENTION

The present invention is directed to a liquid ejection head with high dimensional accuracy of the opening width of an opening in a liquid supply port, allowing a liquid refilling capability to be stabilized, as well as a method for manufacturing the liquid ejection head. The present invention is also directed to a liquid ejection head with high dimensional accuracy of the distance from the opening end of the liquid supply port to the energy generating element to allow the liquid refilling capability to be stabilized, as well as a method for manufacturing the liquid ejection head.

The liquid ejection head can be mounted on printers, copying machines, facsimiles with a communication system and word processors with a printer unit, and also on industrial printing devices used in combination with a variety of processing devices. By using this liquid ejection head, it is possible to print on a variety of print media, such as paper, threads, fibers, cloth, leather, metal, plastics, glass, wood, and ceramics. Word "print" in this specification means imparting to print media not only images having significance or meaning such as letters and figures, but also images with no meaning such as patterns.

The words "ink" or "liquid" should be interpreted in abroad sense and thus the ink, by being applied on the printing media, shall mean a liquid to be used for forming images, designs, patterns and the like, processing the printing medium or processing inks. Processing the printing medium or processing inks include coagulation or encapsulation of coloring materials in the inks to be applied to the printing media for the purpose of improvement of fixing, printing quality, coloring and endurance of images, for example.

According to an aspect of the present invention, a liquid ejection head includes a substrate, an ejection port, a liquid channel, and a supply port. The substrate has, above one side thereof, an energy generating element configured to generate energy used to eject liquid. The ejection port, from which a liquid is ejected, is located at a position corresponding to the energy generating element. The liquid channel communicates with the ejection port and penetrates the substrate from the one side to another side of the substrate. The supply port communicates with the liquid channel. The substrate has a projecting layer extending inward of an inner peripheral portion of an opening in the supply port in the one side, and the projecting layer and the energy generating element are formed of the same material. The projecting layer projecting inward of the inner peripheral portion of the opening in that part of the liquid supply port which is in communication with the liquid channel is disposed on the substrate. The accurately formed liquid flow adjusting layer appropriately controls the flow rate of the liquid. This enables the liquid refilling capability of the liquid ejection head to be stabilized. The frequency properties of the liquid ejection head are thus stabilized.

The method for manufacturing the liquid ejection head in accordance with the present invention enables the projecting layer to be accurately manufactured. This allows the appropriate control of the flow rate of the liquid ejected from the ejection ports.

Further features of the present invention will become apparent from the following description of exemplary embodiments (with reference to the attached drawings).

DESCRIPTION OF THE EMBODIMENTS

Embodiments of the present invention will be described below.

First Embodiment

Figure 1:
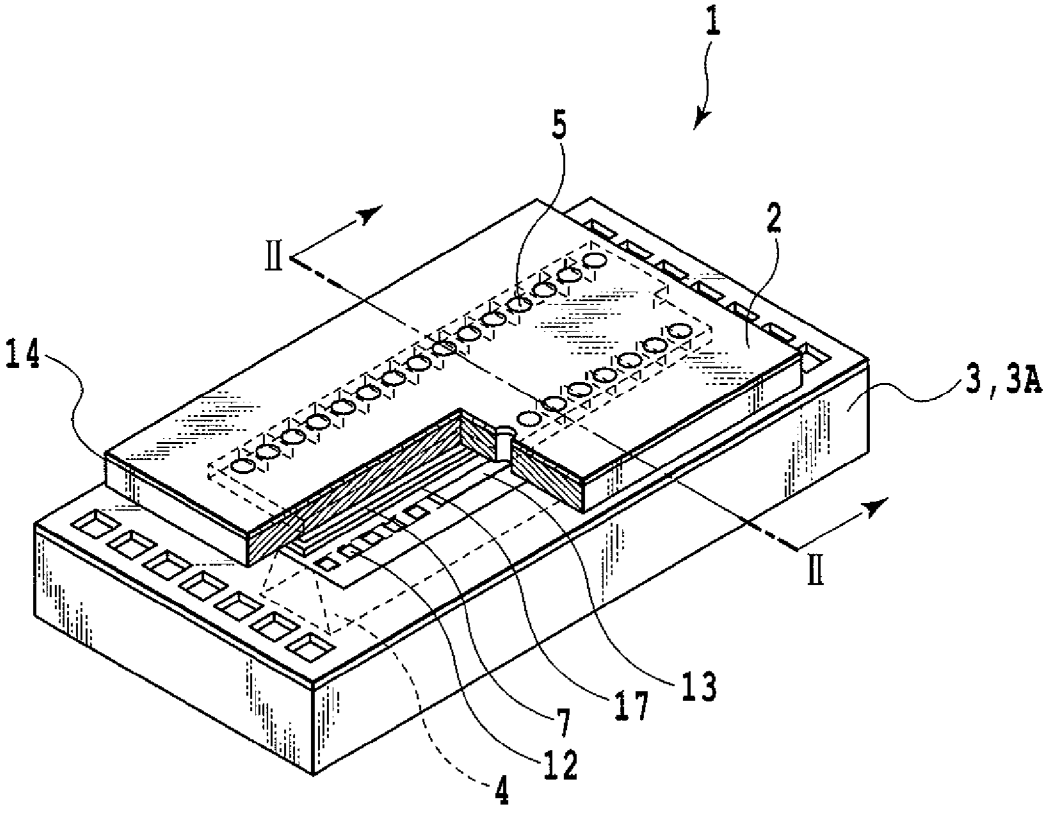
FIG. 1 is a partly exploded perspective view of an ink jet print head in accordance with a first embodiment of the present invention.
Figure 2:
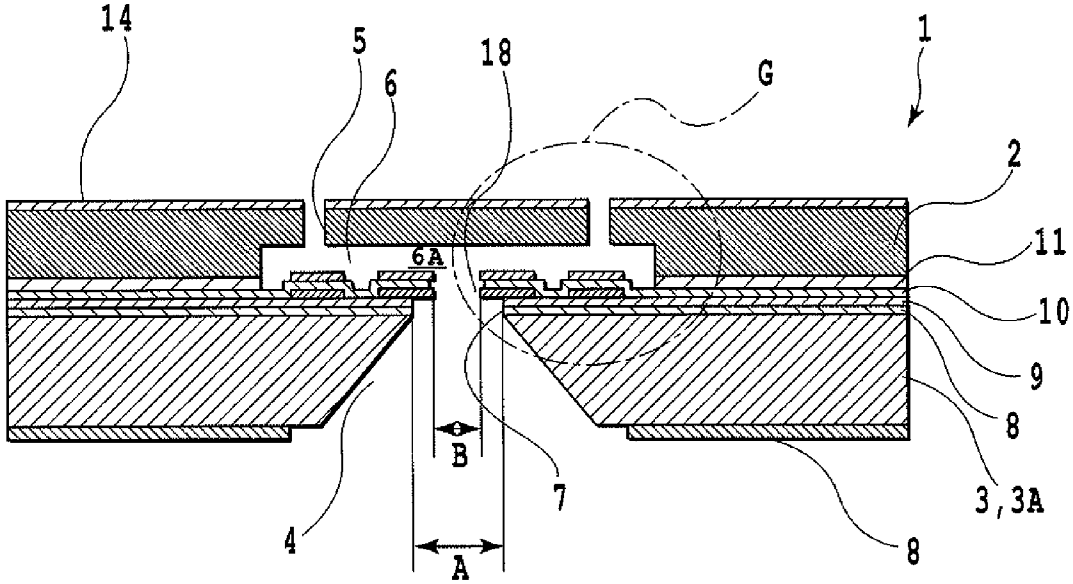
FIG. 2 is a sectional view schematically showing the ink jet print head in FIG. 1 and taken along line II-II in FIG. 1.
Figure 3:
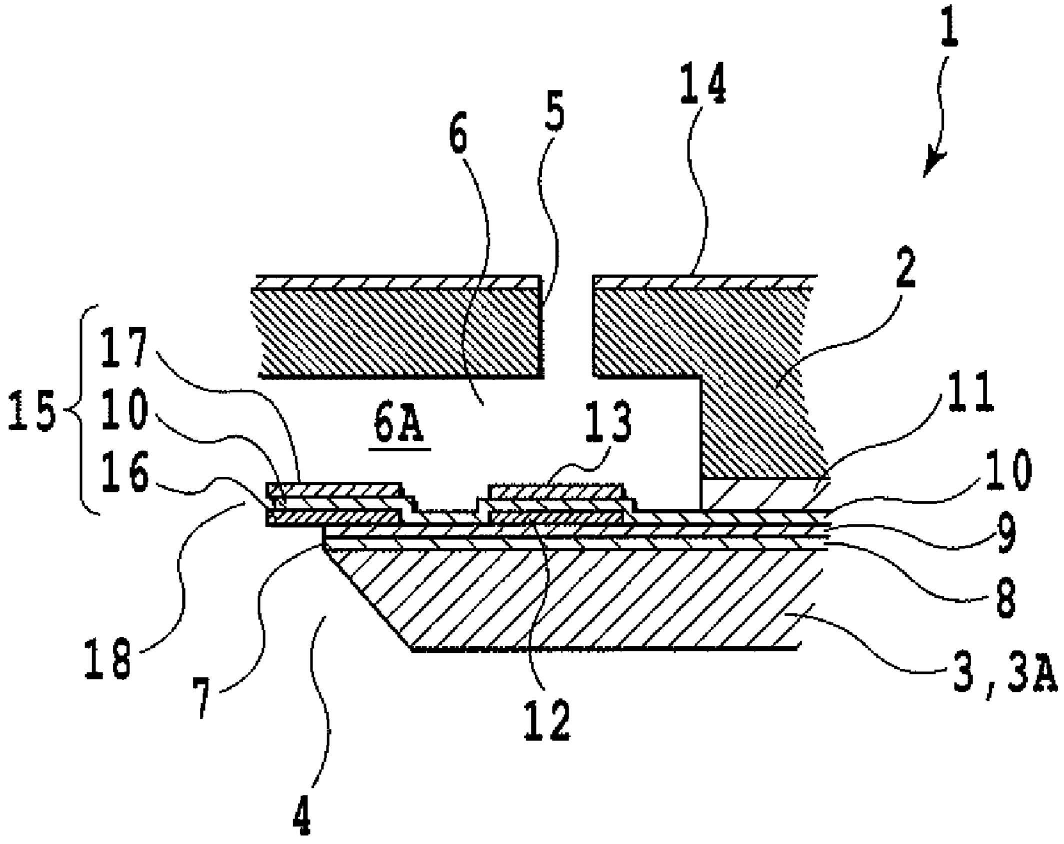
FIG. 3 is an enlarged view of an area G of the ink jet print head in FIG. 2.

FIG. 1 shows a perspective view of an ink jet print head 1 as a liquid ejection head in accordance with a first embodiment of the present invention. FIG. 2 shows a schematic sectional view of the inkjet print head 1 in FIG. 1, taken along line II-II in FIG. 1. FIG. 3 is an enlarged view of area G in the sectional view in FIG. 2. An ink tank (not shown) containing ink is connected to the ink jet print head 1 to supply ink to an ink supply port (liquid supply port) 4 in the ink jet print head 1 via a communication path (not shown). The ink jet print head 1 is constructed by joining an ejection port forming layer 2, what is called an orifice plate, to a front surface of a substrate 3.

The ink supply port 4 is formed to penetrate the substrate 3. In the present embodiment, the ink supply port 4 is formed so that the opening width of the ink supply port 4 decreases from a back surface of the substrate 3, that is, from an upstream side of an ink supply path, toward the front surface, that is, the surface on which the ejection port forming layer 2 is located.

A plurality of ejection ports 5 are formed in a surface of the ejection port forming layer 2 which is to be located opposite a print medium. The ejection port forming layer 2 and the substrate 3 define an ink chamber 6A having an ink channel (liquid channel) 6 that is in communication with ejection ports 5 and the ink supply port 4. The ink chamber 6A has an opening width larger than that of an opening 7 in the ink supply port 4.

The substrate 3 is produced by sequentially forming a thermal oxide film 8, an interlayer insulating film 9, a protective film 10, and an adhesion improving layer 11 on a silicon base 3A. The thermal oxide film 8 also serves as a stop layer that stops an etching step described below. The interlayer insulating film 9 is a layer that electrically insulates the substrate 3 from wires connected to heater elements 12 described below. The protective film 10 is formed of SiN (silicon nitride) in order to compensate for the insufficient rigidity of the substrate 3 and each of the layers arranged on the substrate 3. The adhesion improving layer 11 is located to improve the adhesion between the substrate 3 and the ejection port forming layer 2. The adhesion improving layer 11 is formed of a thermoplastic resin. The thermal oxide film 8 is formed by partly oxidizing the substrate 3 and thus does not increase the thickness of the substrate 3. The thermal oxide film 8 is also formed on the back surface of the substrate 3.

The heater elements 12 are arranged on the substrate 3 in two rows at predetermined pitches; the heater elements 12 are energy generating elements which generate energy used to eject ink and generate heat when energized. Although not shown in the present embodiment, the actual ink jet print head 1 has wires connected to the heater elements 12 and driving elements that drive the heater elements 12, and so on. The ejection ports 5 are formed in the ejection port forming layer 2 in association with the heater elements 12 on the substrate 3.

A cavitation resistant layer 13 is located on the respective heater elements 12. The heater elements 12 are in a harsh environment; the heater elements 12 may be exposed to a temperature rise and a temperature drop of several hundreds degrees Celsius in a short time, and subjected to a mechanical shock by cavitation resulting from the repetition of bubbling and debubbling. To protect the heater elements 12 from the harsh environment, the cavitation resistant layer 13, formed of, for example, tantalum (Ta), a mechanically stable metal, is located on the heater elements 12.

A water repellent layer 14 is formed on a surface of the ejection port forming layer 2 which is to be located opposite a print medium, so as to cover the entire surface.

In the present embodiment, a projecting layer 15 is formed on the substrate 3 so as to extend inward of an inner peripheral portion of the opening 7 in the ink supply port 4. Specifically, the projecting layer 15 is formed of the protective film 10, second heater elements 16, and second cavitation resistant layers 17. Here, the second heater elements 16 formed of the same material as that of the heater elements 12 are located between the protective film 10 and the substrate 3. The second cavitation resistant layer 17 formed of the same material as that of the cavitation resistant layer 13 is located at positions corresponding to the second heater elements 16 on the protective film 10.

As shown in FIG. 2, when the opening width of the ink supply port 4 is defined as A and the opening width of an ink flow rate adjusting opening 18 formed by the projecting layer 15 is defined as B, the relationship A>B is satisfied. The layers of the projecting layer 15 are formed in an area in which the layers are in contact with ink. Thus, the projecting layer 15 has ink resistance.

Figure 4:
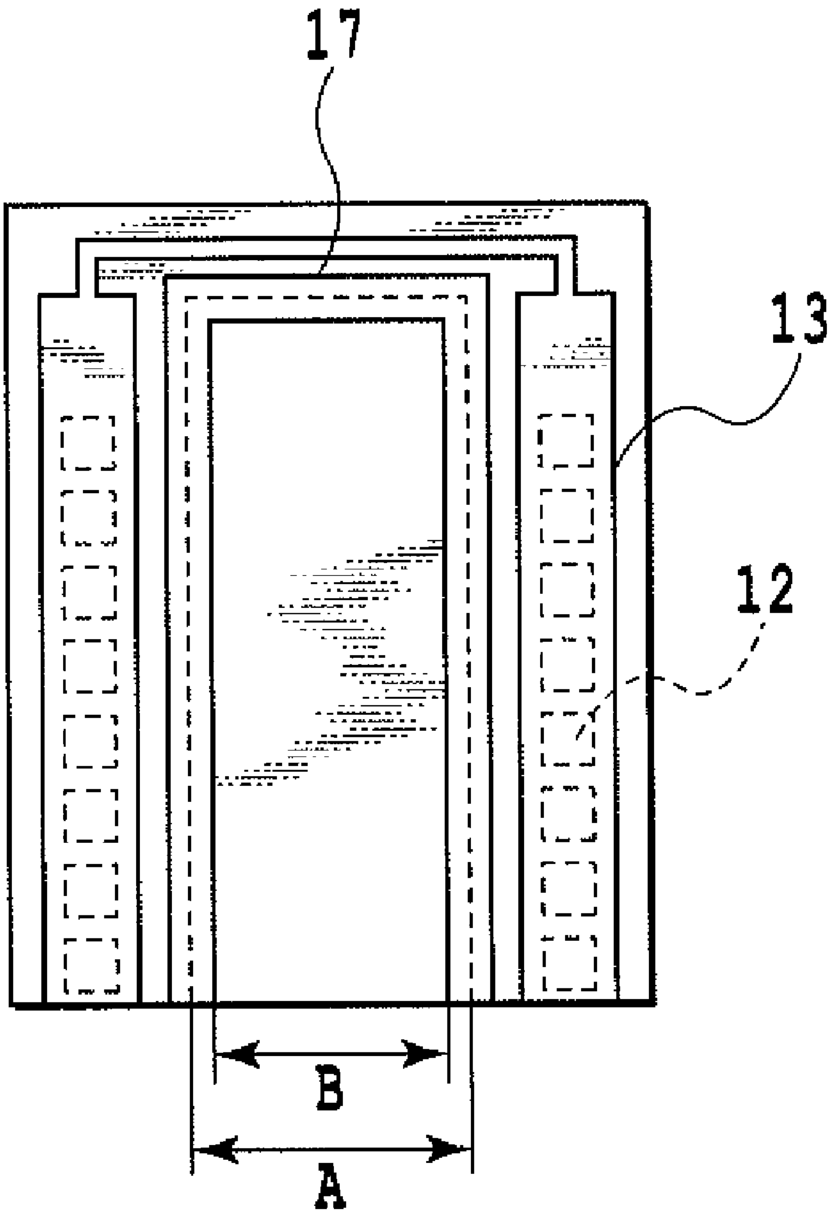
FIG. 4 is a plan view of the ink jet print head in FIG. 1 from which an ejection port forming layer has been removed, as viewed from a front surface side.

FIG. 4 is a plan view showing the ink jet print head 1 in FIG. 2 from which the ejection port forming layer 2 has been removed for illustration. As shown in FIG. 4, the ink supply port 4 and the ink flow rate adjusting opening 18 are formed like rectangles each having short and long sides. When the opening width of the ink supply port 4 in a short side direction is defined as A and the opening width of the ink flow rate adjusting opening 18 in the short side direction is defined as B, the relationship A>B is satisfied, as well as shown in FIG. 2.

Now, description will be given of the method for manufacturing the ink jet print head 1 in accordance with the present embodiment.

In the present embodiment, silicon with a crystal orientation <100> is used as the base 3A, constituting the material of the substrate 3. However, the crystal face orientation is not limited to this. Other crystal orientations may be used.

Figure 5A:
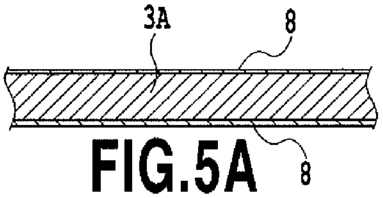
FIGS. 5A to 5L are diagrams illustrating a process of manufacturing the ink jet print head in FIG. 1.
Figure 5B:
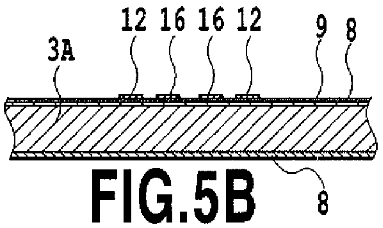
Figure 5C:
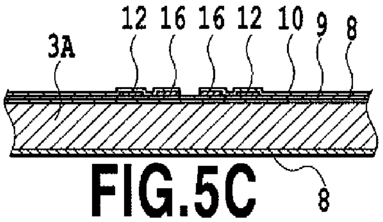
Figure 5D:
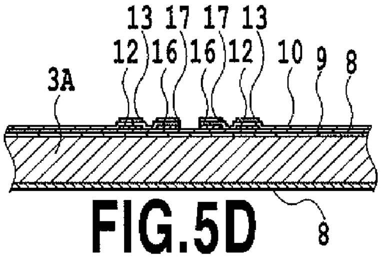
Figure 5E:
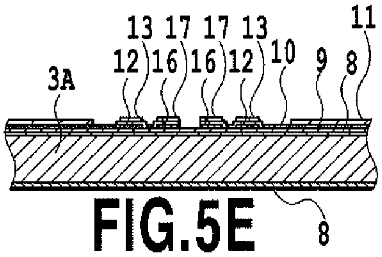

First, as shown in FIG. 5A, the thermal oxide film 8 is formed on each of the front and back surfaces of the base 3A. Then, as shown in FIG. 5B, the interlayer insulating film 9 is located on the thermal oxide film 8. The heater elements 12 are arranged on the interlayer insulating film 9, and the second heater elements 16 are arranged on the thermal oxide film 8, at the same time. Once the heater elements 12 and the second heater elements 16 are arranged, the protective film 10 is located on the top surfaces of the heater elements 12, second hater materials 16, and a part of the interlayer insulating film 9 as shown in FIG. 5C. Then, as shown in FIG. 5D, the cavitation resistant layer 13 is placed on appropriate parts of the top surface of the protective film 10. The second cavitation resistant layer 17 is also arranged on appropriate parts of the top surface of the protective film 10, at the same time. A layer forming the projecting layer 15 is thus located on the base 3A. At this time, the layers forming the projecting layer 15 are formed and patterned into a desired shape by photolithography, respectively. This enables the projecting layer 15 to be accurately positioned. Then, as shown in FIG. 5E, the adhesion improving layer 11 is formed on the top surface of the protective film 10 and patterned into a desired shape by photolithography. The thermal oxide film 8, the interlayer insulating film 9, the protective film 10, and the adhesion improving layer 11 are thus formed on the base 3A. In this case, as described below in a fifth embodiment, a second adhesion improving layer formed of the same material as that of the adhesion improving layer 11 may be formed on the top surface of the second cavitation resistant layer 17 of the projecting layer 15 by patterning. In present embodiment, the thermal oxide film 8 is defined as an inorganic layer.

Figure 5F:
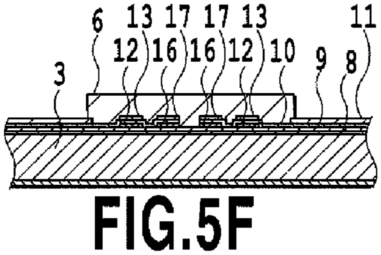
Figure 5G:
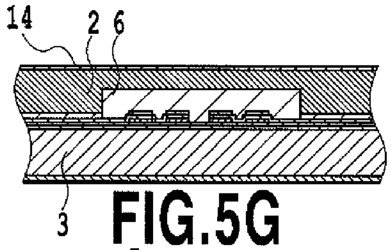

Then, as shown in FIG. 5F, a dissolvable resin layer is located on the top surface of the base 3A via the projecting layer 15 and other layers so as to constitute an area corresponding to an ink channel 6 and an ink chamber 6A later. The substrate 3 is thus formed. Then, as shown in FIG. 5G, in this state, the ejection port forming layer 2 is formed on the substrate 3 via the adhesion improving layer 11 and other layers. The ejection port forming layer 2 can be polymerized and cured by receiving light or thermal energy and then adheres tightly to the substrate 3. The water repellent layer 14 is formed on a print medium-side surface of the ejection port forming layer 2.

Figure 5H:
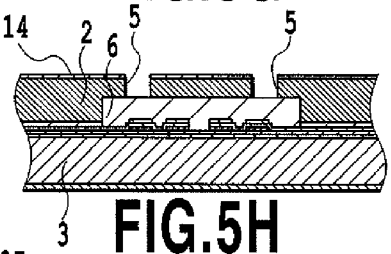
Figure 5I:
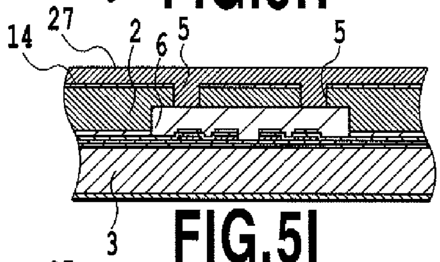

Once the ejection port forming layer 2 is cured, the ejection ports 5 are formed in the ejection port forming layer 2 as shown in FIG. 5H. The ejection ports 5 are accurately positioned on the ejection port forming layer 2 by photolithography. Then, as shown in FIG. 5I, the ejection port forming layer 2 is coated with a coating material 27 such as wax or cyclization rubber so as to be protected from a solution used for etching for forming the ink supply port 4.

Figure 5J:
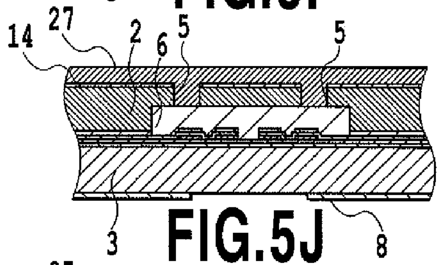

Then, as shown in FIG. 5J, a method such as wet etching using BHF solution or dry etching using $CF_4$ is executed to remove that area of the thermal oxide film 8 on the back surface of the substrate 3 in which the ink supply port 4 is to be formed. Here, the thermal oxide film 8 on the back surface of the substrate 3 subsequently functions as a mask for an etching step for forming the ink supply port 4.

Figure 5K:
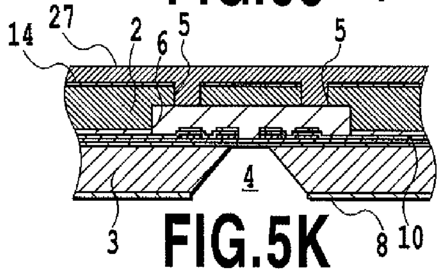

Then, anisotropic etching is performed using a strong alkali solution such as TMAH (tetra methyl ammonium hydroxide) or KOH (potassium hydroxide). The anisotropic etching is performed on that area of the back surface of the substrate 3 from which the thermal oxide film 8 has been removed until the substrate 3 is penetrated. Upon reaching the thermal oxide film 8 on the front surface of the substrate 3, the etching is stopped. The thermal oxide film 8 as the inorganic layer thus functions as an etching stop layer. Thus, as shown in FIG. 5K, the ink supply port 4 is formed in the substrate 3.

The layers formed on the substrate 3 so as to constitute the projecting layer 15 offers alkali resistance. This is because even when the projecting layer 15 is already accurately positioned, the projecting layer 15 may be corroded by a strong alkali solution during etching and thus have deviated dimensions of the ink flow rate adjusting opening 18.

Figure 5L:
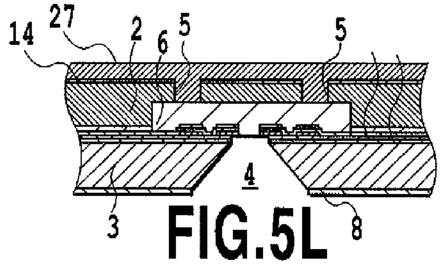

Then, as shown in FIG. 5L, a method such as plasma dry etching using $CF_4$ is applied to the area corresponding to the substrate front surface-side opening in the ink supply port 4 to remove the corresponding area of the thermal oxide film 8 to allow the ink supply port 4 to communicate with the ink channel 6. In this case, the cavitation resistant layer 13 and second cavitation resistant layer 17 of the projecting layer 15 are constructed so as to contain metal such as Ta. Consequently, even with the application of the method such as plasma dry etching, the projecting layer 15 can be selectively left by adjusting an amount of etching gas, instead of being eliminated.

Then, the resin layer located in an area corresponding to the ink channel 6 is dissolved and removed to form the ink channel 6 and the ink chamber 6A. The coating material 27 such as wax or sensitized rubber is removed, which has been used for protecting the ejection port forming layer 2 from the solution used to form the ink supply port 4. The ink jet print head 1 in accordance with the present embodiment, shown in FIG. 2, is thus manufactured.

The present embodiment uses the thermal oxide film 8 as a stop layer that ends the etching step. However, the present invention is not limited to this, and a silicon nitride film or the like may be used.

In the present embodiment, the projecting layer 15 is formed by photolithography while being accurately positioned by photolithography. This allows the stable setting of the opening width of the ink flow rate adjusting opening 18, defined by the projecting layer 15. In this case, the opening width of the ink flow rate adjusting opening 18 is accurately defined regardless of the etching rate of the substrate 3. Consequently, the high dimensional accuracy of the opening width of the ink flow rate adjusting opening 18 can be fixed to stabilize the ink refilling capability. This also fixes the high dimensional accuracy of the distance from the opening end of the ink flow rate adjusting opening 18 to the heater elements 12. This allows the appropriate control of the flow rate of ink flowing to the ink channel 6 through the ink flow rate adjusting opening 18.

Moreover, instead of using a new material to form the projecting layer 15, the present embodiment uses the same material as that of the heater elements 12, the cavitation resistant layer 13, or the like to form the projecting layer 15 when each heater element 12, the cavitation resistant layer 13, or the like is formed on the substrate 3. Consequently, the conventional material forms and functions as the projecting layer 15, making it possible to prevent an increase in the manufacturing costs of the ink jet print head 1. Furthermore, the projecting layer 15 can be formed simultaneously with the formation of each heater element 12 or the cavitation resistant layer 13 is formed on the substrate 3. This enables the manufacturing process to be achieved without the need to add new manufacturing steps to the process.

Now, description will be given of the operation of the ink jet print head 1 in accordance with the present embodiment. When ink is filled into the ink jet print head 1, the ink is fed from the ink tank (not shown) to the ink supply port 4 and then to the ink channel 6. The ink jet print head 1 performs printing by driving the heater elements 12 to bubble the ink filled in the ink channel 6 to generate pressure, thus ejecting ink droplets from the ejection ports 5 and landing on the print medium.

In the ink jet print head 1 in accordance with the present embodiment, the projecting layer 15 is accurately formed to stabilize the ink refilling capability. This stabilizes the amount of ink ejected and thus the frequency properties. Therefore, the print quality of the ink jet print head 1 is improved.

Second Embodiment

Figure 6:
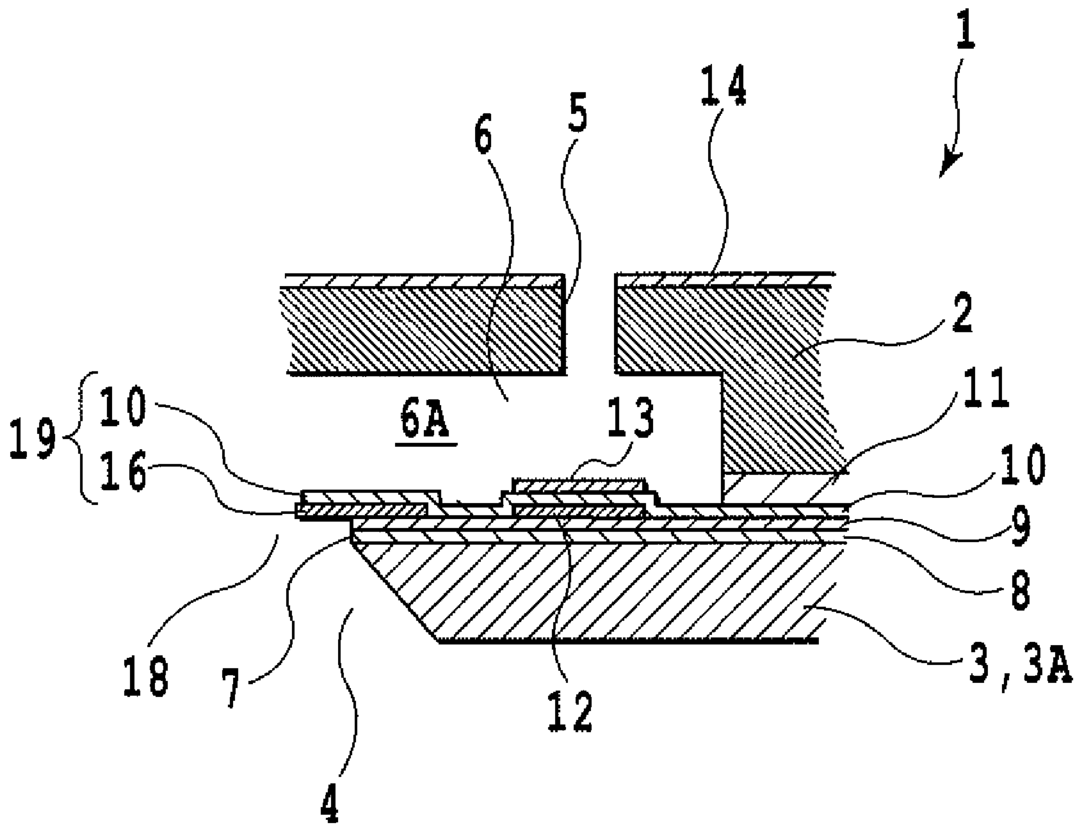
FIG. 6 is an enlarged sectional view of an essential part of an ink jet print head in accordance with a second embodiment of the present invention.

A second embodiment of the present invention will be described with reference to FIG. 6. The same components of the second embodiment as those of the first embodiment are denoted by the same reference numerals and will not be described below. Only the differences from the first embodiment will be described.

In the first embodiment, the projecting layer 15 is formed of the protective film 10, the second heater elements 16, and the second cavitation resistant layer 17. In contrast, in the second embodiment, a projecting layer 19 is formed only of the protective film 10 and the second heater elements 16. This embodiment is effective in case that the projecting layer 19 exhibits a sufficient strength even without the second cavitation resistant layer 17. Thus, the present embodiment reduces the number of layers constituting the projecting layer 19. Therefore, a stress generating in the projecting layer 19 can be reduced.

Third Embodiment

Figure 7:
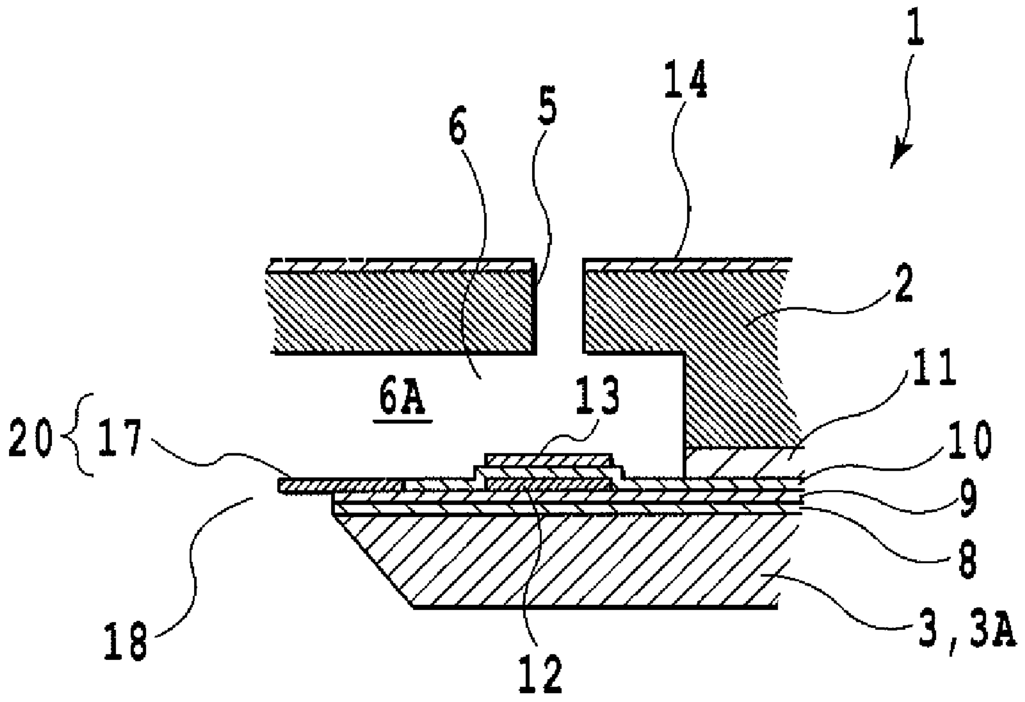
FIG. 7 is an enlarged sectional view of an essential part of an ink jet print head in accordance with a third embodiment of the present invention.

A third embodiment of the present invention will be described with reference to FIG. 7. The same components of the third embodiment as those of the first and second embodiments are denoted by the same reference numerals and will not be described below. Only the differences from the first and second embodiments will be described.

In the third embodiment, a projecting layer 20 is formed only of the second cavitation resistant layer 17. The present embodiment uses this configuration because the projecting layer 20 formed only of the second cavitation resistant layer 17 exhibits sufficient strength. The further reduced number of layers constituting the projecting layer 20. Therefore, a stress generating in the projecting layer 20 can be reduced. The second cavitation resistant layer 17 which constitutes the projecting layer 20 in the present embodiment contains tantalum Ta, which is mechanically stable, and particularly contains one of TaSiN (tantalum silicon nitride), TaAl (tantalum aluminum), and TaN (tantalum nitride). This enhances the strength of the projecting layer 20 so that the projecting layer 20, formed only of the one layer, exhibits sufficient strength.

Fourth Embodiment

Figure 8:
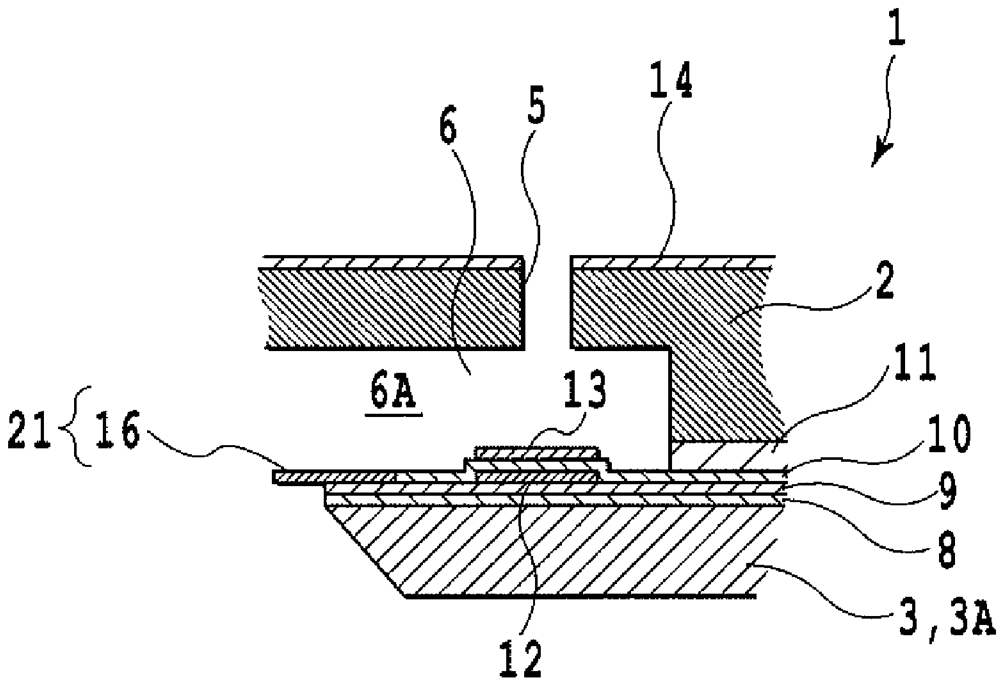
FIG. 8 is an enlarged sectional view of an essential part of an ink jet print head in accordance with a fourth embodiment of the present invention.

A fourth embodiment of the present invention will be described with reference to FIG. 8. The same components of the fourth embodiment as those of the first to third embodiments are denoted by the same reference numerals and will not be described below. Only the differences from the first to third embodiments will be described.

In the fourth embodiment, a projecting layer 21 is formed only of the second heater elements 16. The present embodiment uses this configuration because the projecting layer 21 formed only of the second heater elements 16 exhibits sufficient strength as well as the third embodiment. Therefore, the projecting layer 21 is formed only of the one layer, enabling a reduction in a stress generating in the projecting layer 21.

Fifth Embodiment

Figure 9:
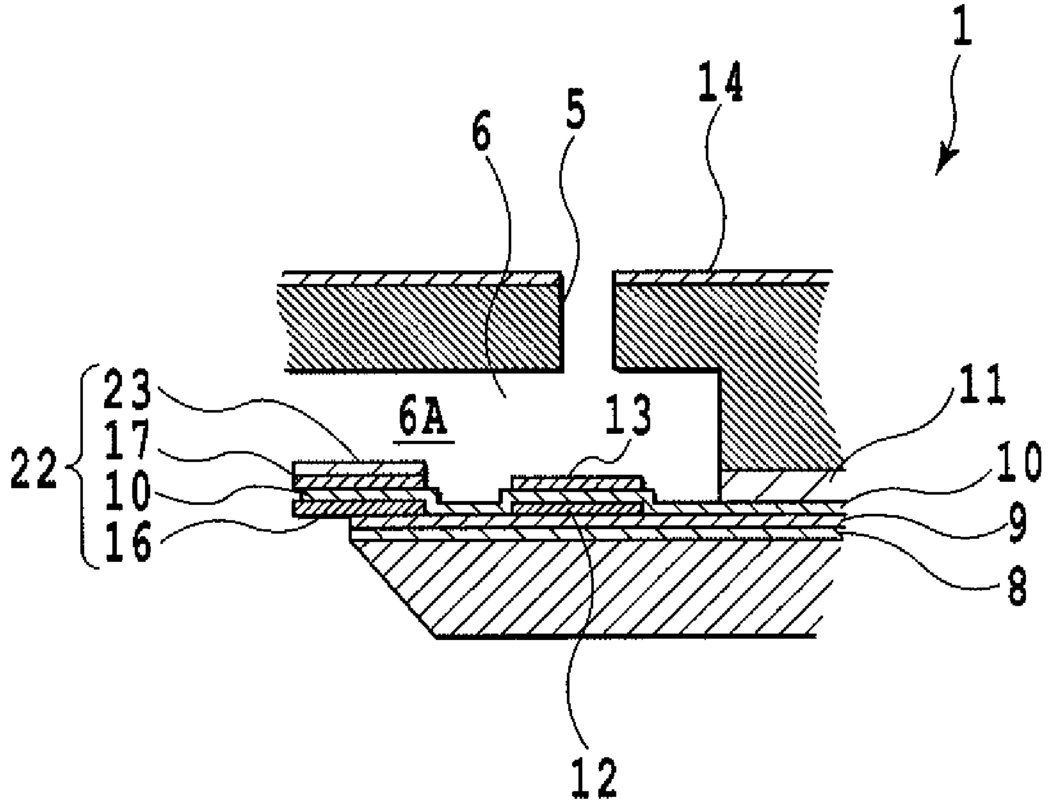
FIG. 9 is an enlarged sectional view of an essential part of an ink jet print head in accordance with a fifth embodiment of the present invention.

A fifth embodiment of the present invention will be described with reference to FIG. 9. The same components of the fifth embodiment as those of the first to fourth embodiments are denoted by the same reference numerals and will not be described below. Only the differences from the first to fourth embodiments will be described.

In the fifth embodiment, a projecting layer 22 is formed by arranging a second adhesion improving layer 23, on the top surface of the second cavitation resistant layer 17, the protective film 10, second heater elements 16, and the second cavitation resistant layer 17, used in the first embodiment. In the present embodiment, the second adhesion improving layer 23 functions as a reinforcing layer that reinforces the projecting layer. Here, the second adhesion improving layer 23 is formed of the same material as that of the adhesion improving layer 11. The adhesion improving layer 11 is formed of the thermoplastic resin to improve the adhesion between the substrate 3 and the ejection port forming layer 2. If the projecting layer in accordance with the first embodiment has insufficient strength, the projecting layer 22 is formed by placing the second adhesion improving layer 23 on the top surface of the second cavitation resistant layer 17 as the present embodiment. This improves the strength of the projecting layer 22, which can thus endure a harsher environment. The durability of the ink jet print head 1 is thus improved. Furthermore, the second adhesion improving layer 23 is formed simultaneously with the formation of the adhesion improving layer 11, located between the substrate 3 and the ejection port forming layer 2. This eliminates the need to add a new step for the manufacture of the ink jet print head 1. However, a decrease occurs in the height in the ink channel 6 from the projecting layer 22 to the print medium side of the ejection port forming layer 2.

Sixth Embodiment

Figure 10:
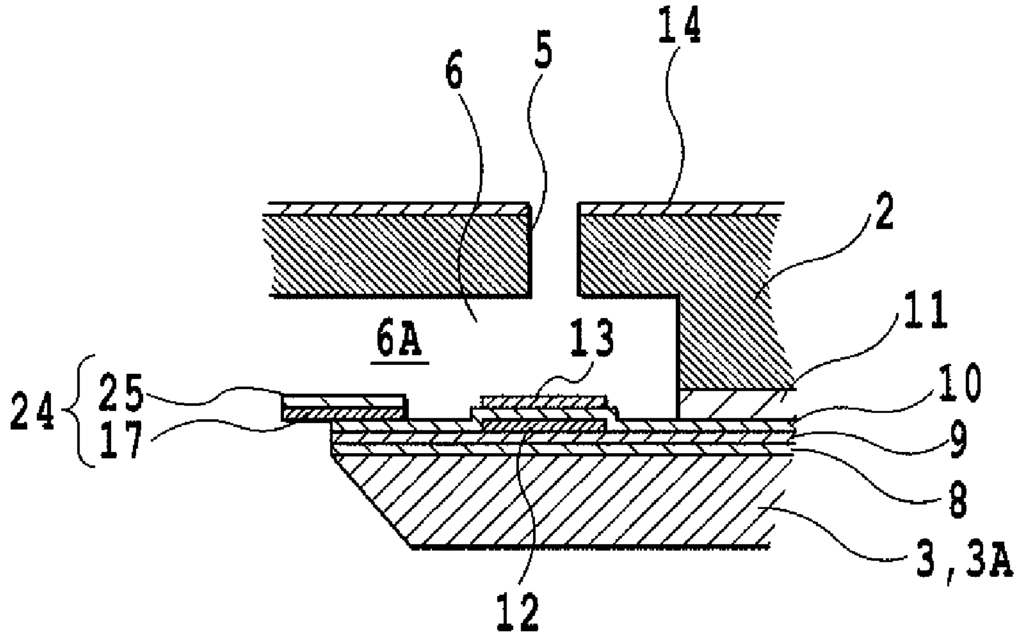
FIG. 10 is an enlarged sectional view of an essential part of an ink jet print head in accordance with a sixth embodiment of the present invention.

A sixth embodiment of the present invention will be described with reference to FIG. 10. The same components of the sixth embodiment as those of the first to fifth embodiments are denoted by the same reference numerals and will not be described below. Only the differences from the first to fifth embodiments will be described.

In the first to fifth embodiments, the projecting layer is formed of the same material as that of part of the layers arranged on the substrate 3 during the manufacture of the ink jet print head 1. However, the present embodiment applies a new material that forms a projecting layer 24. In the present embodiment, the projecting layer 24 is formed by placing the second cavitation resistant layer 17 on the substrate 3 and placing a reinforcing layer 25 on the second cavitation resistant layer 17. A reinforcing layer 25 is placed newly, and is formed to reinforce the second cavitation resistant layer 17. The present embodiment forms the reinforcing layer 25 and patterns the reinforcing layer 25 by the photolithography technique that uses polyether amide so that the resulting reinforcing layer 25 has the same dimensions as those of the second cavitation resistant layer 17.

The reinforcing layer 25 is not limited to polyether amide, and any other material may be used. However, the projecting layer 24 contacts the etchant during the etching step for forming the ink supply port 4 in the substrate 3. Accordingly, the material which is not damaged even when exposed to the strong alkali solution such as TMAH or KOH, which is used as the etchant is selected to manufacture the reinforcing layer 25. Furthermore, the projecting layer 24 is positioned in an area where the projecting layer 24 comes into contact with ink when the manufactured ink jet print head 1 is used. The projecting layer 24 is thus formed of an ink resistant material. That is, any material can be used to form the reinforcing layer 25 provided that the material has strong alkali resistance and ink resistance.

Figure 11:
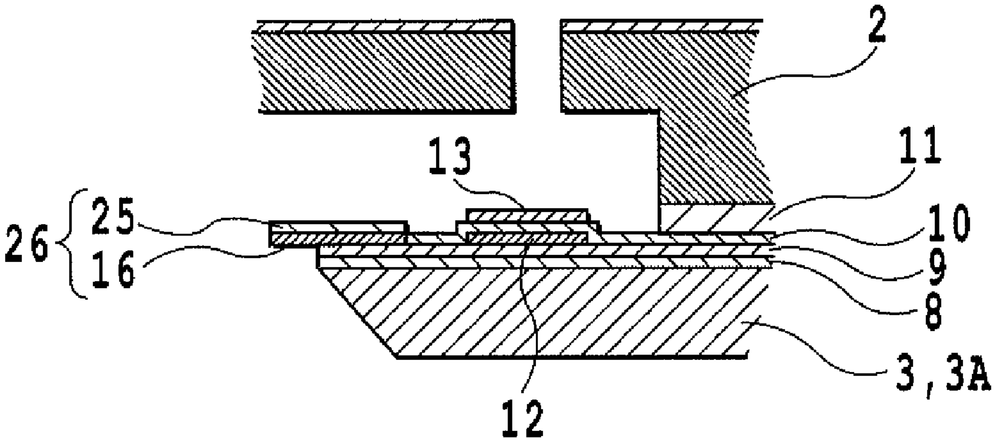
FIG. 11 is an enlarged sectional view of an essential part of another ink jet print head in accordance with the sixth embodiment of the present invention.
Figure 12:
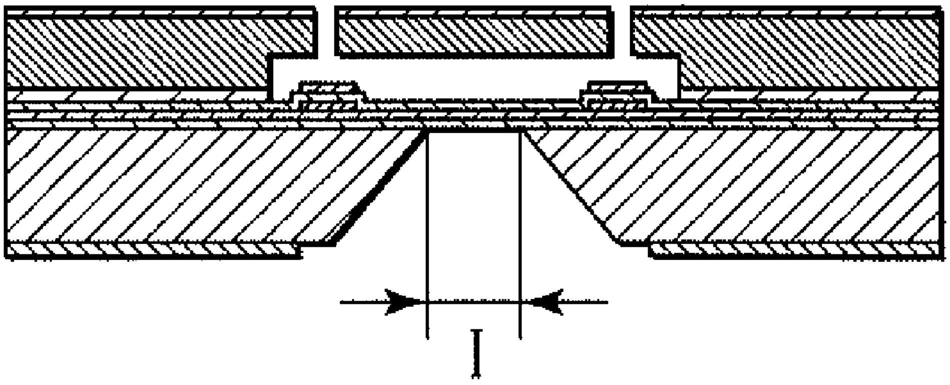
FIG. 12 is a sectional view of a liquid ejection head being manufactured, the view illustrating a conventional method for manufacturing a liquid ejection head.
Figure 13A:
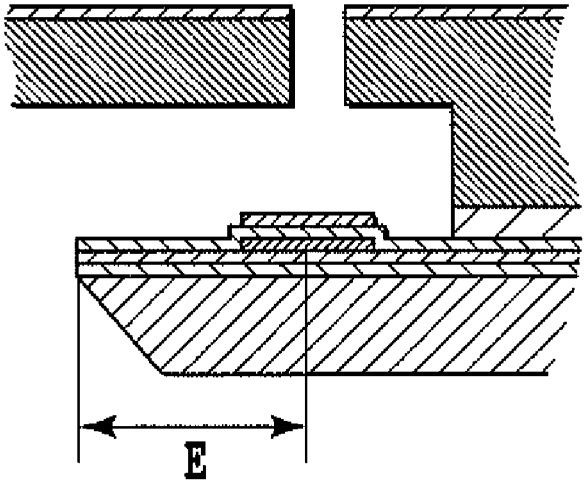
FIGS. 13A and 13B are sectional views showing the distance from an energy generating element to the opening end of a liquid supply port in the liquid ejection head, the views illustrating the conventional method for manufacturing the liquid ejection head.
Figure 13B:
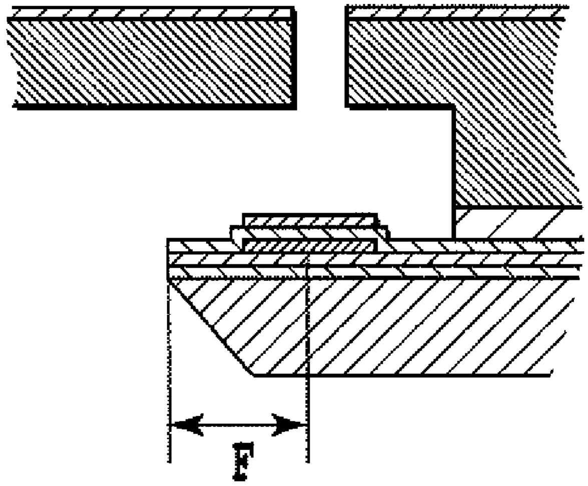

Further, the reinforced layer is not limited to the second cavitation resistant layer 17. As shown in FIG. 11, a projecting layer 26 may be formed of the second heater elements 16 and the reinforcing layer 25 reinforcing the second heater elements 16. Layers different from the second cavitation resistant layer 17 and the second heater elements 16 may be reinforced by the reinforcing layer.

Furthermore, the sixth embodiment uses the new material to form the reinforcing layer 25 reinforcing the projecting layer. However, the new material may solely form the projecting layer. In this case, the material forming the projecting layer is selected from materials which has strong alkali resistance and ink resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for manufacturing a liquid ejection head, the liquid ejection head comprising:

a substrate having, above one side thereof, an energy generating element configured to generate an energy used to eject liquid;

an ejection port from which a liquid is ejected, the ejection port being located at a position corresponding to the energy generating element;

a liquid channel which is in communication with the ejection port, the liquid channel penetrating the substrate from the one side to another side of the substrate; and a supply port in communication with the liquid channel, the method comprising the steps of:

forming the energy generating element and forming a projecting layer above the one side such that the layer is formed of a same material as that of the energy generating element extending inward of an inner peripheral portion of an opening in the supply port in the one side; and forming the supply port in the substrate.

2. The method according to claim 1, wherein the projecting layer has alkali resistant, and wherein the forming step includes forming the supply port by etching using an alkali liquid.

3. The method according to claim 1, further comprising:

forming an inorganic layer serving as an etching stop layer before the step of forming the energy generating element, the step of forming the supply port including a step of forming the supply port in the substrate and exposing the inorganic layer by etching; and removing part of the inorganic layer by etching and exposing the layer extending inward of an inner peripheral portion of an opening in the supply port.

* * * * *